US010560893B2

(12) United States Patent
Lin et al.

(10) Patent No.: US 10,560,893 B2
(45) Date of Patent: Feb. 11, 2020

(54) COMMUNICATIONS SYSTEM, AN ACCESS NETWORK NODE AND A METHOD OF OPTIMIZING ENERGY CONSUMED IN A COMMUNICATION NETWORK

(71) Applicant: ALCATEL LUCENT, Boulogne-Billancourt (FR)

(72) Inventors: Chih-Kuang Lin, Boulogne-Billancourt (FR); Vijay Venkateswaran, Boulogne-Billancourt (FR)

(73) Assignee: ALCATEL LUCENT, Boulogne-Billancourt (FR)

( * ) Notice: Subject to any disclaimer, the term of this patent is extended or adjusted under 35 U.S.C. 154(b) by 0 days.

(21) Appl. No.: 15/029,051

(22) PCT Filed: Sep. 26, 2014

(86) PCT No.: PCT/EP2014/002631
§ 371 (c)(1),
(2) Date: Apr. 13, 2016

(87) PCT Pub. No.: WO2015/062690
PCT Pub. Date: May 7, 2015

(65) Prior Publication Data
US 2016/0242117 A1 Aug. 18, 2016

(30) Foreign Application Priority Data
Oct. 31, 2013 (EP) ..................................... 13360034

(51) Int. Cl.
*H04W 52/02* (2009.01)
*H04W 4/70* (2018.01)
(Continued)

(52) U.S. Cl.
CPC ......... *H04W 52/0229* (2013.01); *H04W 4/70* (2018.02); *H04W 24/02* (2013.01);
(Continued)

(58) Field of Classification Search
CPC ... H04W 52/0229; H04W 4/70; H04W 24/02; H04W 48/16; H04W 52/0206;
(Continued)

(56) References Cited

U.S. PATENT DOCUMENTS 7,542,437 B1 * 6/2009 Redi .................. H04W 52/0206
370/311
8,301,176 B1 * 10/2012 Yellin ............... H04W 52/0229
455/458
(Continued)

FOREIGN PATENT DOCUMENTS

EP 1628438 A2 * 2/2006 ........ H04W 52/0216
EP 1628438 A2 2/2006
(Continued)

OTHER PUBLICATIONS

Energy conservation in wireless sensor networks: A survey Giuseppe Anastasi a , Marco Conti b,*, Mario Di Francesco a,*, Andrea Passarella; published Jul. 29, 2008"http://cnd.iit.cnr.it/andrea/docs/aohoc09.pdf".*
(Continued)

*Primary Examiner* — Hardikkumar D Patel
(74) *Attorney, Agent, or Firm* — Harness, Dickey & Pierce, P.L.C.

(57) ABSTRACT

There is provided a communications system comprising an access network node and a plurality of resource limited nodes. The access network node comprises: a control unit operable to estimate a belief on a network condition for a resource limited node of the plurality of resource limited nodes based on network observations and a history profile of the network observations; dynamically update the belief for the resource limited node in the access network node; determine that the severity of the updated belief in the network condition is indicative that a change in sleep duty cycle of the resource limited node is required; determine that
(Continued)

correlation between the resource limited nodes within the plurality of resource limited nodes is indicative that a change in sleep duty cycle of the resource limited node is required; and update the sleep duty cycle of the resource limited node to optimize the overall energy consumed in the resource limited nodes while achieving a specific detection threshold.

11 Claims, 9 Drawing Sheets

(51) Int. Cl.
*H04W 24/02* (2009.01)
*H04W 48/16* (2009.01)
*H04W 84/18* (2009.01)

(52) U.S. Cl.
CPC ....... *H04W 48/16* (2013.01); *H04W 52/0206* (2013.01); *H04W 52/0216* (2013.01); *H04W 52/0219* (2013.01); *H04Q 2209/43* (2013.01); *H04W 84/18* (2013.01); *Y02D 70/144* (2018.01); *Y02D 70/162* (2018.01); *Y02D 70/21* (2018.01); *Y02D 70/22* (2018.01)

(58) Field of Classification Search
CPC ......... H04W 52/0216; H04W 52/0219; H04W 84/18; H04W 4/005; H04W 72/12; H04W 72/1215; Y02D 70/22; Y02D 70/21; Y02D 70/144; Y02D 70/162; Y02B 60/50; H04M 1/7253; H04Q 2209/43
See application file for complete search history.

(56) References Cited

U.S. PATENT DOCUMENTS

| | | |
|---|---|---|
| 2002/0199102 A1 | 12/2002 | Carman et al. |
| 2006/0013172 A1* | 1/2006 | Ruuska ................ H04B 1/7143 370/338 |
| 2006/0039320 A1 | 2/2006 | Kang et al. |
| 2006/0167784 A1* | 7/2006 | Hoffberg ............. G06Q 20/401 705/37 |
| 2008/0293422 A1 | 11/2008 | Kang et al. |
| 2009/0055268 A1* | 2/2009 | Knoller .................. G06Q 30/02 705/14.61 |
| 2012/0231828 A1 | 9/2012 | Wang et al. |
| 2012/0279676 A1 | 11/2012 | Gan et al. |
| 2013/0316745 A1 | 11/2013 | Takano |
| 2015/0110030 A1* | 4/2015 | Kim ..................... H04W 24/10 370/329 |

FOREIGN PATENT DOCUMENTS

| | | |
|---|---|---|
| EP | 2247145 A1 | 11/2010 |
| EP | 2677818 A1 | 12/2013 |
| KR | 20060016718 A | 2/2006 |
| KR | 20090090461 A | 8/2009 |
| KR | 20130033181 A | 4/2013 |
| WO | WO-2012111483 A1 | 8/2012 |
| WO | WO-2013/008136 A1 | 1/2013 |

OTHER PUBLICATIONS

YongHo Kwon et al., "A Stability of P-persistent MAC Scheme for Periodic Safety Messages with a Bayesian Game Model," Korea Institute of Communication Sciences, Journal of KICS, 38(7), Jul. 2013.
International Search Report PCT/ISA/210 for International Application No. PCT/EP2014/002631 dated Dec. 9, 1014.
Written Opinion of the International Searching Authority PCT/ISA/237 for International Application No. PCT/EP2014/002631 dated Dec. 9, 2014.
Chinese Office Action dated Aug. 3, 2018 issued in Chinese Application No. 20140059706.3.
Chinese Office Action dated Mar. 14, 2019 issued in Chinese Application No. 201480059706.3.
Chinese Office Action dated May 21, 2019 issued in Chinese Application No. 201480075824.3.

* cited by examiner

COMMUNICATIONS SYSTEM, AN ACCESS NETWORK NODE AND A METHOD OF OPTIMIZING ENERGY CONSUMED IN A COMMUNICATION NETWORK

CROSS-REFERENCE TO RELATED APPLICATIONS

This is a National Phase of PCT Patent Application No. PCT/EP2014/002631 filed on Sep. 26, 2014, and claims priority to, European Application No. 13360034.6, filed Oct. 31, 2013, the contents of each of which are hereby incorporated by reference in their entirety.

FIELD OF THE INVENTION

The present invention relates to a communications system, an access network node and a method of optimising energy consumed in a communication network comprising a plurality of resource limited nodes and an access network node.

BACKGROUND OF THE INVENTION

Machine to machine (M2M) networks and devices are increasingly growing in number and are projected to outnumber existing cellular networks. However, existing personal area networks (PAN) standards such as IEEE 802.15.4 and Zigbee are not equipped to handle such a large amount of traffic, particularly whilst increasing communications range and reducing power. These networks are expected to cover a wide variety of applications ranging from smart energy meters, temperature/traffic monitoring, body area networks and industrial automation to name but a few examples.

One important consideration in machine to machine communications is the battery life of sensor nodes or indeed other resource limited nodes in the network. It is desirable that battery lifetimes of sensor nodes for machine to machine communications should be of the order of years as opposed to days, as seen in cellular communications, and less than 1 to 2 months in current personal area networks and machine to machine standards.

In view of this, sensor nodes are required to have a low duty cycle for these various operating modes and remain in sleep mode for most of the time. In sleep mode, most of the transceiver components of a sensor node, such as the digital transmission blocks, power amplifiers, receiver chain and micro-processor are turned off. In order to transfer information to the network, sensor nodes occasionally transition from sleep mode to active transmit and receive modes and communicate data to and from the network.

One technique for controlling the duty cycle of a sensor node is to synchronize sensor nodes to periodically wake up from a sleep mode to an active mode. In active mode, the sensor node scans the physical network and enables information transfer to and from the network. This technique is disadvantageous as the sensor node will periodically wake up from sleep mode to active mode, regardless of whether it has any information to transmit/receive, and it may involve a sensor transitioning to an active state to serve no function.

Another technique for controlling the duty cycle of a sensor node is to control the sensor node so that it remains in an idle state and then transition to an active mode in which the sensor scans the physical network and enables information transfer to and from the network. The idle state is a state in which the transmit/receive functions are turned off and are not being used but their controller is powered such that it can be readily used. Therefore, in idle mode, the sensor node consumes less power than in a transmit/receive modes, but it consumes more power than when in sleep mode.

A further technique for controlling the duty cycle of a sensor node is to periodically wake up a sensor node. Depending on events from the sensor or co-ordinator, transmission with the network can be controlled. This is disadvantageous as it requires the sensor nodes to wake up regardless of whether there is anything to sense, thereby potentially wasting power.

In a still further technique, neighbouring sensor nodes can co-ordinate their duty cycles.

All of the above techniques require sensing and acknowledgement of the wireless channel to achieve communication, which in turn consumes a significant amount of energy. Therefore, sensor nodes using the above techniques will be limited to battery lifetimes of the order of 1 to 2 months. In particular, in medium to large networks, the sensor nodes may expend significantly more energy in sensing and sleep cycle management when compared to communication updates with the network.

It is therefore desirable to provide mechanisms to optimise the sleep duty cycle of sensor nodes.

SUMMARY OF THE INVENTION

According to a first aspect of the invention, there is provided a communications system comprising an access network node and a plurality of resource limited nodes, the access network node comprising: a control unit operable to estimate a belief on a network condition for a resource limited node of the plurality of resource limited nodes based on network observations and a history profile of the network observations; dynamically update the belief for the resource limited node in the access network node; determine that the severity of the updated belief in the network condition is indicative that a change in sleep duty cycle of the resource limited node is required; determine that correlation between the resource limited nodes within the plurality of resource limited nodes is indicative that a change in sleep duty cycle of the resource limited node is required; and update the sleep duty cycle of the resource limited node to optimize the overall energy consumed in the resource limited nodes while achieving a specific detection threshold.

The control unit may be operable to update the sleep duty cycle of the resource limited node to optimize the overall energy consumed in the resource limited node while achieving a specific detection threshold, when the severity of the updated belief in the network condition as well as the correlations between resource limited nodes indicates that a change in sleep duty cycle of the resource limited node is required.

The control unit may determines that the severity of the updated belief in the network condition is indicative that a change in sleep duty cycle of the resource limited node is required to optimize the overall energy consumed in the resource limited node while achieving a specific detection threshold, and the correlation between the resource limited nodes is not indicative that a change in sleep duty cycle of the resource limited node is required, no update in the sleep duty cycle of the resource limited node is performed.

When the control unit determines that the severity of the updated belief in the network condition indicates a critical event, the sleep duty cycle of the resource limited node may be reduced to trigger the resource limited node to more frequently switch from a sleep mode to an active mode.

When the control unit determines that the severity of the updated belief in the network condition indicates that the event severity is low, the sleep duty cycle of the resource limited node may be increased to trigger the resource limited node to less frequently switch from a sleep mode to an active mode.

The definition of the severity of the updated belief in the network condition may be tuneable and dependent on an application requirement, operator choice, or adaptive learning process defined by the application or system operator.

Correlation between the resource limited nodes within the plurality of resource limited nodes may be based on the topographical relationship between local nodes, application correlations between resource limited nodes, statistical correlation between their wireless channels or a combination thereof.

The topographical relationship between local nodes may comprise the physical proximity of the resource limited node to the other nodes of the plurality of resource limited nodes and communication proximity of the resource limited node to the other nodes of the plurality of resource limited nodes. Such a correlation between the resource limited nodes may be classified as a neighbouring table.

The correlation metric between local nodes may be a filter that ensures that the sleep duty cycle of the part of the communications network likely to be affected by the network condition to be updated while the sleep duty cycles of the parts of the communications network unlikely to be affected by the network condition remain unchanged. The selection of any correlation metric depends on the system operator or application requirement.

At initialisation of the communications network, the sleep duty cycle of the resource node may be an optimized sleep duty cycle and the method of sleep management dynamically updates the sleep duty cycles of affected nodes while the communications network is in operation to ensure the sleep duty cycle is optimised.

At initialisation of the communications network, the method of sleep management may determine any starting value for the sleep duty cycle parameter and dynamically updates the sleep duty cycle while the communications network is in operation to ensure the sleep duty cycle is optimised.

The belief update on the network condition may be estimated using a multi-stage Bayesian method with game-theoretic payoff functions for different strategy pairs.

The belief update on the network condition may be estimated by using a Bayesian Nash Equilibrium analysis in conjunction with the Bayesian rule and a set of network observations.

The belief update on the network condition may be estimated using a robust and low overhead statistical method. The belief update on the network condition may be estimated using any machine learning method, likes exponentially-weighted moving average (EWMA) method, Kalman filter, Neural network, or the like.

According to a second aspect of the invention, there is provided an access network node in a communications network comprising a plurality of resource limited nodes, the access network node comprising: a control unit operable to estimate a belief on a network condition for a resource limited node of the plurality of resource limited nodes based on network observations and a history profile of the network observations; dynamically update the belief for the resource limited node in the access network node; determine that the severity of the updated belief in the network condition is indicative that a change in sleep duty cycle of the resource limited node is required; determine that correlation between the resource limited nodes within the plurality of resource limited nodes is indicative that a change in sleep duty cycle of the resource limited node is required; and update the sleep duty cycle of the resource limited node to optimize the overall energy consumed in the resource limited nodes while achieving a specific detection threshold.

According to a third aspect of the invention, there is provided a method of optimising energy consumed in a communications network comprising a plurality of resource limited nodes and an access network node, the method comprising: estimating a belief on a network condition for a resource limited node of the plurality of resource limited nodes based on network observations and a history profile of the network observations; dynamically updating the belief for the resource limited node in the access network node; determining that the severity of the updated belief in the network condition is indicative that a change in sleep duty cycle of the resource limited node is required; determining that correlation between the resource limited nodes within the plurality of resource limited nodes is indicative that a change in sleep duty cycle of the resource limited node is required; and updating the sleep duty cycle of the resource limited node to optimize the overall energy consumed in the resource limited nodes while achieving a specific detection threshold.

According to a fourth aspect of the invention, there is provided a computer program product operable when executed on a computer to perform the method of the above third aspect.

Further particular and preferred aspects of the invention are set out in the accompanying independent and dependent claims.

BRIEF DESCRIPTION OF THE DRAWINGS

Some embodiments of the apparatus and/or methods in accordance with embodiment of the present invention are now described, by way of example only, with reference to the accompanying drawings, in which:

FIG. 1 shows a typical M2M communications network 10 with heterogeneous applications, namely application 1 and application 2. The M2M network 10 may for example be a sensor network and may comprise an access network 12 in communication with a plurality of M2M devices 14, 16 through a M2M gateway 18. The M2M gateway 18 may be considered to be an access network node of the access network 12. In the M2M network 10 of FIG. 1, a first plurality of the M2M devices 14 may be related to a first application 1 and a second plurality of the M2M devices 16 may be related to a second application 2. For example, M2M devices 14 may be energy meters, and M2M devices 16 may be industrial sensors. Indeed the M2M devices may relate to a diverse range of applications, such as, but not limited to energy meters, industrial sensors, body area networks and smart city monitors.

Figure 1:
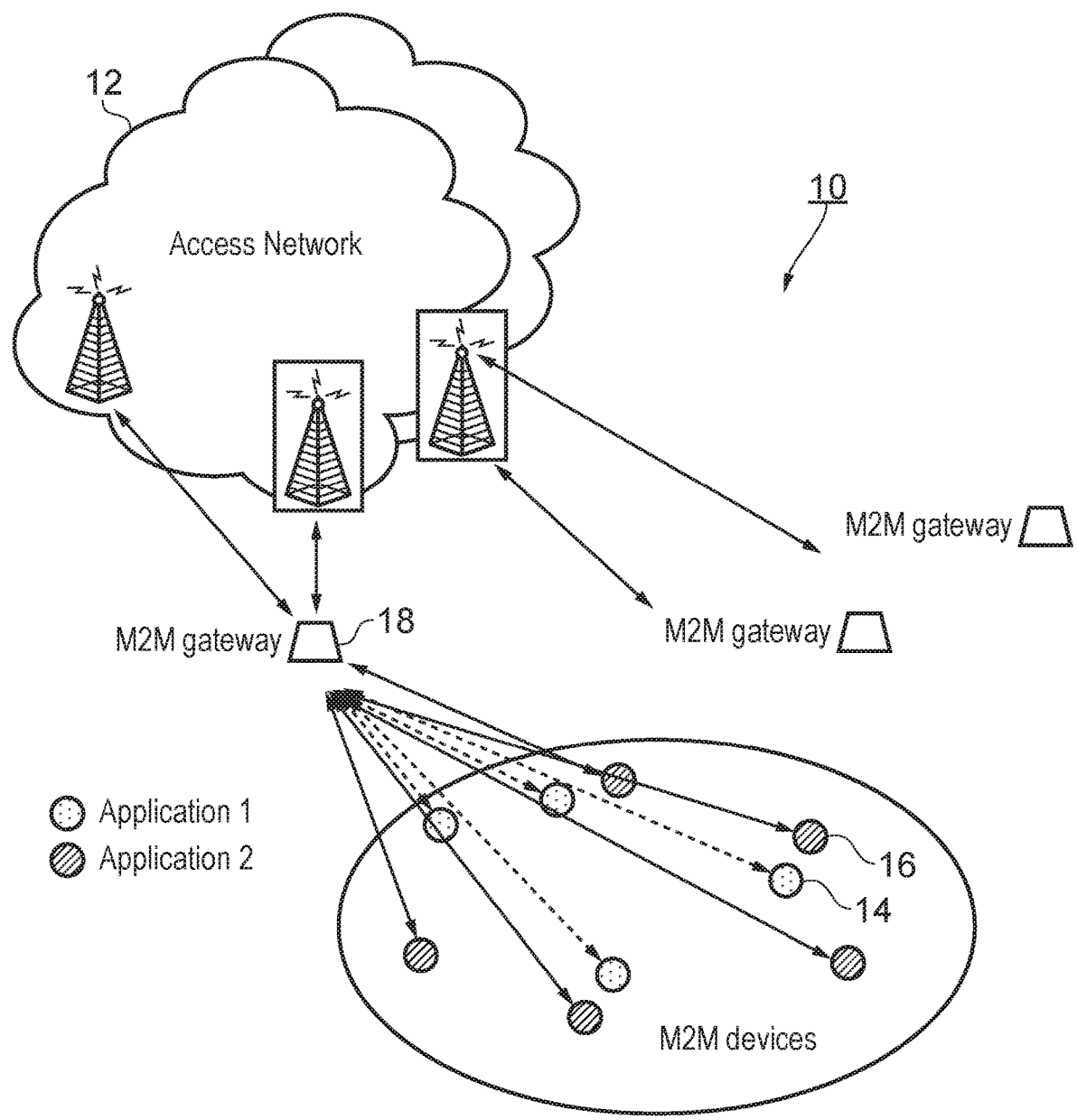
FIG. 1 schematically shows a typical M2M network with heterogeneous applications.

Each of the M2M devices 14, 16 may be considered to be a resource limited node of the communications network 10. For example, the M2M devices 14, 16 may be an energy/power limited in that they are battery powered and the lifetime of the battery limits the operational lifetime of the M2M device. It should also be appreciated that the M2M devices may also be spatially limited.

In order to extend the battery life of the M2M devices, it is desirable that the M2M devices be kept in sleep mode for the longest period of time possible. It is therefore desirable to provide a method to optimize the sleep duty cycle of the M2M devices in the communications network in order to reduce energy consumption and increase battery lifetime.

It is important to note that the overall objective is to allow all the sensor nodes 14, 16 in the network 10 to spend most of their time in sleep mode, while making sure that the sensor nodes can transmit the required payload when required. To transmit, the sensor nodes (M2M devices) must also be able to sense for commands from access gateway for downlink/uplink control, estimate channel, multi access, etc. Note that this sensing activity is inevitable and involves energy consumption. In dense networks transmitting short payloads, power consumed in this sensing operation may be significantly greater than the transmission operation. Frequent channel sensing provides a very good estimate of the physical layer and scheduler, but comes at the cost of increased energy.

Additionally, the M2M communications network 10 is required to cover a heterogeneous set of applications ranging from energy meters, industrial sensors, body area networks, smart city monitors, etc. with each application specified by distinct transmission requirements. In other words, in a dense network of heterogeneous nodes, whom or which sensor to wake-up might be the difference between a M2M device battery life of 1 year or 5 years. When and whom to wake-up depends on the job (application) of the M2M device, where are they located, what is their priority and how are they related to other set of M2M devices in the network.

Further, note that the duty cycle and operations of the M2M devices also depend on changes in environment. Changes in one M2M device may affect a set of devices connected to the said device. Such a change should be dynamically taken into account.

Duty cycle optimization over heterogeneous applications, heterogeneous networks and diverse set of physical requirements and devices cannot be achieved exclusively using existing MAC layer sleep cycle management techniques. In addition, existing MAC layer sleep cycle management techniques require sensing and acknowledgement (sleep→receive→transmit) of the M2M device on a regular basis, which in-turn consumes significant amount of energy. Note that in medium to large networks, the nodes spend significantly more energy for sensing and synchronization than for transmitting data.

Cross layered algorithms are provided to specify when a M2M device is to sleep, when to sense and when to transmit such that overall energy is minimised. In other words, a method of determining an optimal sleep duty cycle to minimise the overall energy consumed in a resource limited node of a communications network is provided.

The proposed approach can start from the link level by considering the physical requirements for communications, and specifies when a M2M device is to sleep. Subsequently, it specifies how every M2M device should access the network in order to minimise overall energy. The sleep, transmission, multi-access and sensing/scheduling is performed with a focus on minimizing the overall energy. This is a deviation from existing multi-access techniques and cellular systems where the focus is on maximizing spectral efficiency.

Further, the proposed approach may also start from a network level approach and integrates different M2M devices based on their applications, priorities, physical properties, environment and/or neighbourhood, to provide a cross-layered solution spanning the physical, MAC, control and application layer in order to optimize the sleep and communications cycle.

Optimal Link Level Duty Cycle

An M2M communication device, such as sensor node 14, 16 in the communications network 10 of FIG. 1, is provided. The M2M device has communication requirements to sleep, transmit, receive, and so on. Given this M2M device for a specific application, traffic and physical requirements (cellular, energy meter, etc), the maximum amount of time that a device can be asleep such that the overall energy is minimised can be determined.

Information Theoretic Duty Cycle

The optimal sleep duty cycle, sense (control) duty cycle and the transmit duty cycle to minimise the overall energy consumed are estimated. Here, duty cycle corresponds to the fraction of time in sleep mode versus total time. Starting from the communication theoretic expression of capacity, the maximum time any M2M device in a network can sleep can be derived to minimise the energy consumption in a resource limited node.

The overall energy consumption for uplink transmission mode, sleep mode, sensing (control) mode and multi-access mode is modelled for a given transceiver and signalling architecture and solved using derivative based techniques. In an example, this can be generalized to account for different M2M devices and M2M applications. The signalling techniques and duty cycles minimizing the overall energy in a transceiver are thus determined.

Multi-Access Scheduling—Extension to Multiple Users

The signalling techniques and duty cycles are accompanied by multi-access schemes. In a scenario where N such M2M devices share time and spectrum, it is desirable to determine how resources can be allocated/scheduled to minimise overall energy consumption.

Overall time and frequency resources blocks can be decomposed into different temporal and spectral resource blocks, and these blocks can be chosen for a specific M2M device in the network to satisfy the required signal to interference plus noise ratio (SINR) levels and while minimizing overall energy.

In an example, a quality of communication metric is specified by physical link and SINR metric, while the cost of communications is specified by energy consumption. A variation of a 'moveRight' process may be used to determine these time and frequency resource blocks, in which relevant metrics such as power consumption and SINR threshold and link quality with cost incurred are introduced. The process can then determine a trade-off between these constraints.

This methodology will estimate the optimal duty cycle for any communication system with sleep, transmit and receive modes, which leads to an optimal duty cycle that can minimise power consumption. In an example, computations are performed in the M2M gateway 18 or access network 12. This is not limited to an M2M network and can also be applied to heterogeneous cellular networks, where femtocells or energy sustaining base stations (ESBSs) sleep for most of the time for example.

Optimal Network Level Duty Cycle

The above describes a mechanism for determining the optimal link level duty cycle and multi-access techniques minimising the overall energy consumption for a given M2M device and application. The characteristic feature of M2M communications is to handle diverse applications and networks. It is therefore desirable to extend the link level M2M network to handle diverse applications, estimate their dependencies and update their duty cycle for more accurate sensing and reduced energy consumption.

The dependencies between M2M nodes for heterogeneous applications can either be due to geographic proximity, due to dependencies between applications (such as temperature sensors with fire alarms), due to priority of a specific M2M device, or due to similar propagation environments.

An optimal duty cycle solution minimising the overall energy can account for these dependencies. Since the energy consumed in accurate sensing in a dense network is more than transmission and sleep modes, the sleep and sense duty cycle may be related with the above dependencies and network neighbourhood information. This information can be used to improve sensing accuracy by combining various low-accuracy sensing estimates from M2M nodes.

More specifically, processes for connecting arbitrary M2M devices in a given network using a probability metric which includes geo-location information, application/M2M device priority, link level duty cycle, and so on are proposed according to an example. This metric can be stacked correspondingly to all nodes in the network. Eigen decomposition, or similar decomposition techniques, can be performed on the stacked probability metric to estimate optimal operating modes and duty cycles for heterogeneous application sleep and scan duty cycle that minimise overall energy.

The two steps for determining the optimal link level duty cycle and determining the optimal network level duty cycle can be specified under an umbrella called the cross-layered duty cycle optimization.

Figure 2:
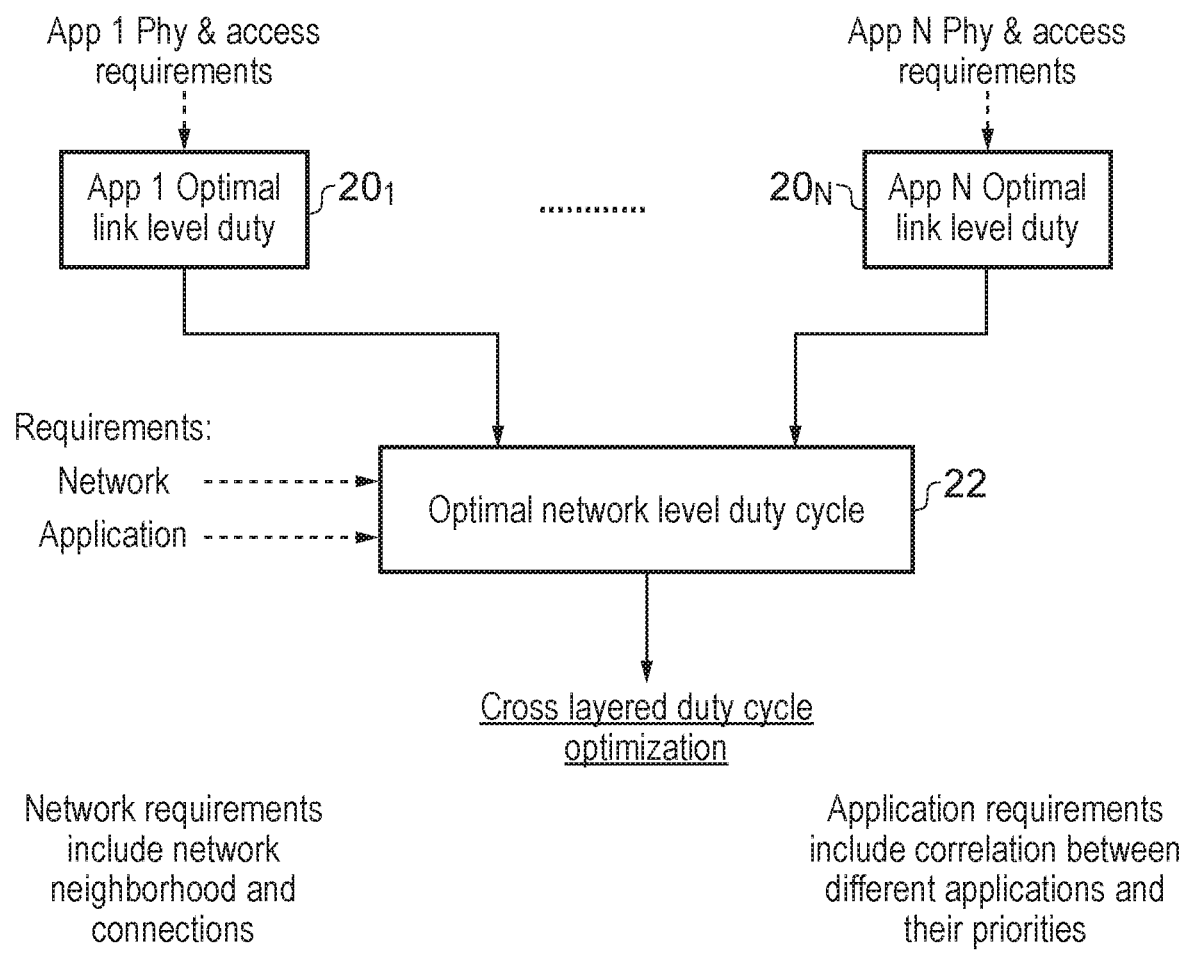
FIG. 2 schematically shows the cross-layered duty cycle optimization.

FIG. 2 schematically shows the cross-layered duty cycle optimization according to an example. In FIG. 2, the optimal link level duty cycle is determined for each of the first to N applications in the communications network at steps 20₁ to 20ₙ. These optimal link level duty cycles are then utilised in determining the optimal network level duty cycle at step 22.

The cross-layered duty cycle optimization of FIG. 2 will now be described in greater detail. A network, such as the communications network 10 of FIG. 1, comprises energy constrained M2M devices (M2MD) connected to energy meters, traffic monitors, data sensors, and the like. These M2M devices communicate with the M2M gateway on a regular or irregular basis and transfer information.

Let N be the number of such nodes with each node communicating a payload $L_n$ bits $n \in \{1, \ldots, N\}$ using a signaling technique (such as PSK, FSK, etc.) over a bandwidth W (Hz), communications range $R_n$ (m), $K_n$ times each day. In this case $K_n$ and $L_n$ depend on the application objectives (such as energy meters, etc). For a given application the rest of the parameters are specified by the physical layer and the multi-access scenario.

The M2M device is assumed to be in sleep mode most of the time to save energy. It transitions from the sleep mode to the active mode in order to communicate with the overall network. The energy consumption in active modes of a M2M device is shown in Table 1 below.

TABLE 1

| Mode of operation | Volt. Reg & Osc | Transceiver | Power |
|---|---|---|---|
| Sleep | Off, Off | Off | 30 µW |
| Idle | On | Off | 3 mW |
| Receive | On | On | 55 mW |
| Transmit (0 dB) | On | On | 49 mW |

Table 1 illustrates which components of the M2M device are in operation in each of the modes and what the power consumption in each of those modes is. The transitions between the modes can either be on a periodic basis or driven by network requirements, node requirements, critical events, etc. As can be seen in table 1, it is desirable for the M2M device to be in the sleep mode for as much time as possible.

Optimal Link Level Duty Cycle Estimation

Given an energy-constrained M2M device or an energy sustaining base station (ESBS) catering to a specific application, traffic and multi-access technique, there are provided link level algorithms and M2M operations specifying when to sleep, wake-up, transmit and sense the M2M device (or ESBS) in order to minimise the overall energy consumption. Multi-access algorithms minimising the overall energy consumed in the M2M node are provided.

Communication Theoretic Algorithms for Duty Cycle Optimization

Optimal sleep duty cycle minimising the overall energy for a given M2M node communicating $K_n$ times each day:

Energy model: Consider an M2M node in uplink transmission mode. The total energy consumed in a given M2M device for transmitting a bit is:

$$E_{tot} = T_{tot}P_{tot} = \frac{\left(\frac{\varepsilon}{\eta}P_{th} + P_{ckt}\right)T_{tx} + P_{sl}T_{sl} + E_{ma}}{L_n} \quad (1)$$

where $\eta$ and $\varepsilon$ respectively correspond to the power amplifier efficiency and peak to average ratio of the signaling scheme, $P_{th}$ and $P_{ckt}$ respectively correspond to the communication theoretic power consumption (which includes signaling, coding and digital processing) and circuit power consumption in the transceiver, $P_{sl}$ and $E_{ma}$ respectively correspond to the power consumption in sleep mode and energy for multi-access, $T_{sl}$ and $T_{tx}$ respectively correspond to the time spent in sleep mode and the transmission of $L_n$ bits. Ignoring the time required to estimate multi-access resources and transition time between sleep mode and active mode, the overall time is $T_{tot}=T_{sl}+T_{tx}$ and the sleep duty cycle is $$\alpha = \frac{T_{sl}}{T_{tot}}.$$

From an information theoretic perspective, for a given signalling technique and physical layer specification, communications range, and so on it is desirable to determine the maximum achievable transmission rate $R_m$ to minimise the energy consumed in communicating $L_n$ bits.

If $E_{ma}=0$ and $P_{ckt}=0$, later algorithms and architectures are proposed that minimise these terms. Also assume that $\eta-1$ and $\varepsilon-1$.

$$P_{tot} = \frac{1}{L_n}\alpha P_{sl} + \frac{W}{R_m}(1-\alpha)\left[2^{\frac{L_n 1}{K_n(1-\alpha)W}} - 1\right] \quad (2)$$

In order to estimate the sleep duty cycle minimizing the overall energy in an example, the information theoretic cost (2) is included in the energy model (1). In an example, $P_{tot}$ is represented in terms of $\alpha$. The partial derivative of $P_{tot}$ in terms of a is determined and $$\frac{\partial P_{tot}}{\partial \alpha}$$

is equated to zero. The condition for optimal alpha or sleep duty cycle minimizing $E_{tot}$ is specified by:

$$\frac{\partial P_{tot}}{\partial x} \Rightarrow 0 \text{ leads to the optimal duty cycle bound by} \quad (3)$$

$$\alpha \leq \frac{W - R_{avm}\log_e 2}{W}$$

Figure 3:
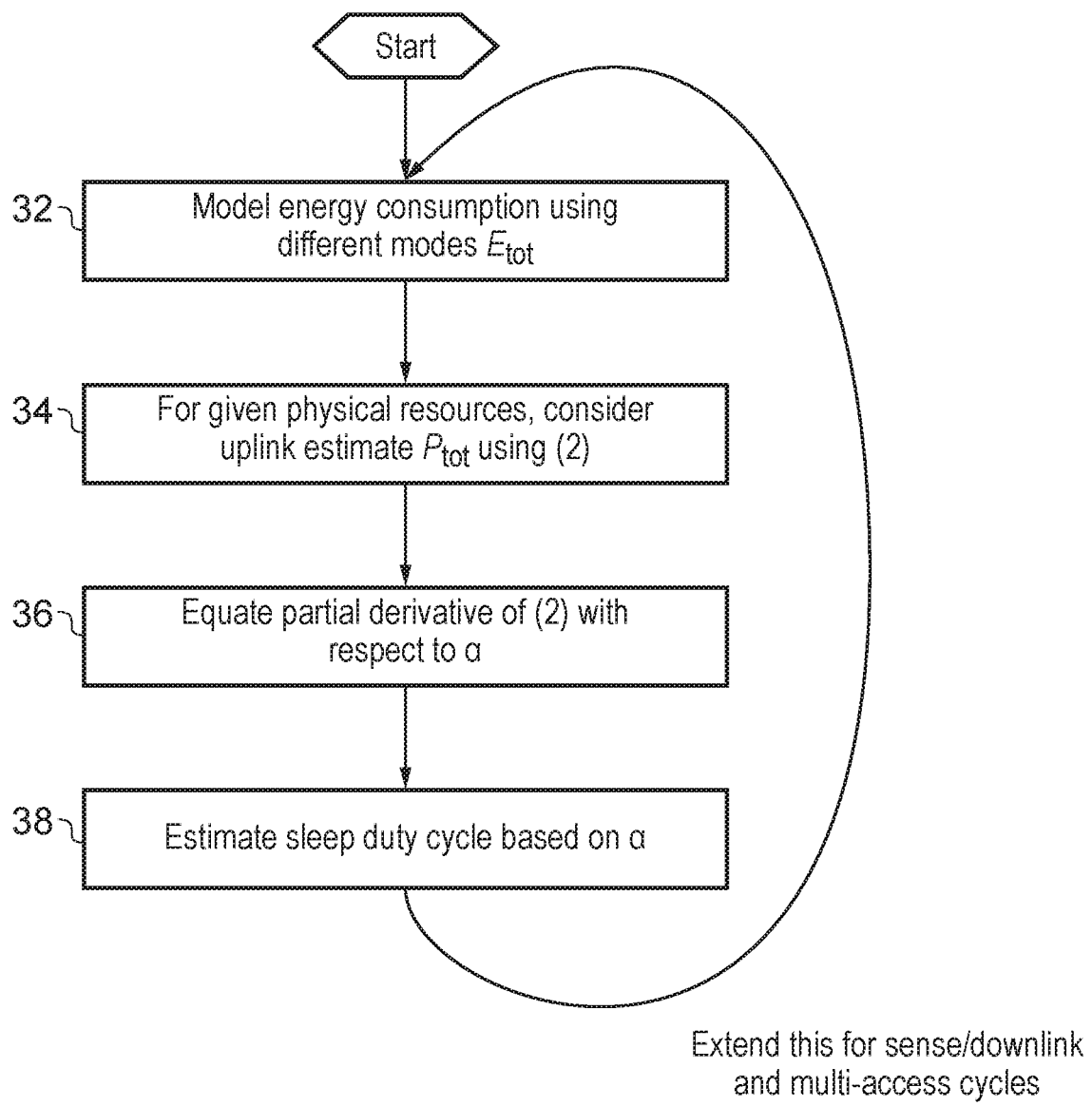
FIG. 3 shows an algorithm flow for estimating the optimal Link level duty cycle.

According to an example, a methodology to estimate the optimal duty cycle for a list of physical requirements and signalling constraints is proposed. FIG. 3 shows the process flow for estimating the optimal Link level duty cycle, which comprises the step 32 of modelling the total energy consumption in a given M2M device suing equation (1), the step 34 of determining the information theoretic cost for given physical resources using the equation (2), the step 36 of equating the partial derivative of equation (2) with respect to the sleep duty cycle a and the step 38 of estimating the sleep duty cycle.

As will be appreciated, the above described method of estimating the optimal Link level duty cycle can be modified for different values of $P_{ckt}$, $\eta$ and $\varepsilon$.

Further, the estimation the optimal link level duty cycle may be extended to multi access algorithms minimizing the overall energy for a specific quality of service. In the above derivation, the optimal sleep duty cycle of different communication modes while minimising the overall energy is estimated with the assumption that a scheduled multi-access transmission is used. Scheduling can be performed over the available resources such as spatial, temporal, spectral or code domain. For the sake of low-complexity M2M nodes, multi-antenna and rake-receiver type architectures may be omitted and the temporal and spectral resources may be considered. In this case, let the overall spectrum and transmission time be respectively divided into blocks of K frequency bins and time instants.

Consider a M2M node $n \in \{1, \ldots, N\}$, with resources allocated in time $\tau_n = [\tau_1 \ldots \tau_K]$ and frequency bins $w_n = [w_1 \ldots w_K]$. Here K corresponds to a specific application. This type of allocation is similar to ones followed according to 3GPP standards for example. The objective is to schedule these bins in a way, such that the overall energy in the uplink transmission is minimised for a specific SINR. The SINR threshold at the M2M gateway for the node n: $\gamma_n$ is specified as the ratio of received signal energy from node n to the overall signal energy for all other nodes. The $\gamma_n$ value can be linked to the desired probability of error rate. The multi-access problem can be specified as choosing appropriate $\tau_n$ and $w_n$ such that the overall SINR is maximized over these resources.

The transmit power from each M2M device is kept to a minimum. This is specified by the transmit power constraint as specified in the below expression:

$$\{\tau_n \ w_n\} = \quad (4)$$
$$\begin{cases} \underset{\tau_n \ w_n}{\arg\max} & \tau_n^T \gamma_n w_n \\ \text{subject to } \frac{\tau_n^T}{g_n}\left[2^{\frac{L_n 1}{\tau_n^T(1-\alpha)w_n}}\right] & w_n \leq \text{transmit power constraint} \end{cases}$$

where $g_n$ is the channel gain and is estimated using pilot signals or from a prior estimate. The objective is to estimate $\tau_n$ and $w_n$.

Mathematically, the above problem can be formulated using typical convex optimization techniques. A low-complexity scheduling technique is provided. This approach is a modified version of the 'moveRight' process. The original version of moveRight provides a low-complexity approach to schedule resources but does not provide any metric on SINR levels and energy consumption. In an example, these factors are included. Subsequently, it is checked whether these blocks satisfy the inequality constraint in equation (4) while maximizing the cost $\tau_n^T \gamma_n w_n$. The proposed process is:

Start with a random set of non-zero blocks for each $\tau_n$
For $\tau_n$ and $w_{n-1}$
If $\tau_n^T \gamma_n w_{n-1} \geq$ previous maximum value while satisfying the constraints in (4)
  Then $w_n = [w_{n-1}]$
  Else $w_n = [w_{n-1}\ 1]$
If size $(w_n) \geq K$
  Then $T_{n+1} = [\tau_n\ 1]$
  Else $\tau_{n+1} = [\tau_n]$
end for loop Optimal Network Level Duty Cycle Estimation As described above, optimal link level duty cycle estimation and multi-access techniques for a given application are proposed. Note that M2M networks contain nodes catering for different applications, traffic and resource constraints. Therefore a cross-layered optimization technique integrating the physical layer estimates of wireless link quality and location with the MAC layer addressing and event triggering techniques and the higher layer applications is further proposed.

Improving Sensing Accuracy at the Network Level

The sensing mode is inevitable and is directly linked to the estimation accuracy in the M2M gateway; this can be improved by:

a. Direct or broadcast network: Sending frequent pilot signals from access network to M2M nodes and estimating the channel state, multi-access, sensor reading, etc from their response at the cost of increased energy consumption.

b. Network neighbourhood discovery: Alternatively, the sensors can provide a list of neighbours to access this network. Depending on the list of neighbours and the quality of their sensing information, the access network can re-estimate and improve the duty cycle of the sensor nodes. Consider the heterogeneous network of FIG. 1 serving heterogeneous applications. The communication and sensing functions of an M2M device can be vastly improved by using information from neighbouring nodes serving a different application.

This approach can be especially useful if some of the nodes are severely constrained by their energy and require a very low sensing cycle. This approach requires knowledge of the layout of the overall network and their connectivity. Once this information is available, accurate sensing information for each node can be deduced from processing the infrequent channel sensing information from a list of connected nodes. In other words, estimating the network neighbourhood leads to an improved sensing estimate from several low-accuracy M2M sensing modes.

In the existing IEEE 802.15.4 standard as well as medium to large networks with 100-1000 nodes for example, the energy consumed during the sensing mode is more than the energy consumed in transmitting short payloads. To improve this sensing time in M2M nodes, existing networks ignore network level information. The duty cycle obtained from estimating the link level duty cycle are updated as described above by exploiting the network level map.

One effective way to analyse the relation between nodes in a given network is through the use of covariance techniques. Covariance metrics obtained from the sensor data may provide the physical layer application and localization. This can be combined with one-hop neighbour values of a specific M2M node may provide the network & MAC layer map.

A weighted combination of these two metrics may provide the cross-layered map. The sensor gateway estimates the wake up duty cycle, given the local neighbourhood coverage, various application requirements and given triggered event info, etc. This approach is estimated in the sensor gateway or access network, with sufficient processing power at its disposal.

Cross-Layered M2M Network Optimization

Consider the given network with N nodes where the link level duty cycles are estimated as described above. Firstly, the sleep duty cycle is considered and later, the sensing and transmit duty cycles are introduced. The optimal sleep mode duty cycles are represented using a N×1 vector $t_{sl} = [T_{sl,1}, \ldots, T_{sl,N}]^T$, where corresponds to the time spent during the sleep mode. The initial values of $T_{sl,i}$ are obtained from the link level duty cycle algorithm.

For simplicity, it is assumed that all the sensors correspond to the same application, however this can be generalized for varying applications as described in more detail below. The priority or weight of a specific node $j, j \in \{1, \ldots, N\}$ is denoted using $w_j$. Among other parameters, the link quality between sensor i and sensor j is specified by the link metric or distance metric $d_{i,j}$. These metrics can be obtained during a network initialization phase and kept fixed henceforth. From a physical layer perspective, the correlation of any two sensors can then be represented using an information or probability metric:

$$p_{i,j} = \begin{cases} 0 & \tilde{p}_{i,j} \leq P_{th} \\ \tilde{p}_{i,j} & \tilde{p}_{i,j} > P_{th} \end{cases}$$

Where $$\tilde{p}_{i,j} = c \frac{1}{d_{i,j}} w_j \frac{T_{sl,j}}{\sum_{k=1}^{N} T_{sl,k}}$$

c is a constant and $P_{th}$ corresponds to some predefined threshold. The complexity of the algorithm can be varied by setting different values of $P_{th}$. The probability measure $p_{i,j}$ is a function of a different duty cycle $T_{sl,j} \forall j \in \{1, N\}$. The set of probability transitions for the entire network of N nodes can be obtained by stacking the probability measures as a N×N matrix:

$$P = \begin{bmatrix} p_{1,1} & p_{1,2} & \cdots \\ \vdots & \ddots & \ddots \\ p_{N,1} & \cdots & p_{N,N} \end{bmatrix}. \quad (5)$$

Optimal Duty Cycle Algorithm for Heterogeneous Applications

The objective to minimise energy is achieved by updating the unit norm vector $t_{sl}$ with respect to the connections, weights and applications as specified by the probability metric matrix (5). Note that the initial $t_{sl}$ does not consider these network connections and its cumulative duty cycle will always be smaller than the $t_{sl}$ updated using network neighbourhood information:

$$\hat{t}_{sl} = \arg \max_{t_{sl}} \|Pt_{sl}\|$$

The optimization function does not specify any limits on the individual duty cycles $T_{sl,j}$. For example, the optimal $t_{sl}$ might have some zero entries. For a practical sensor network this would be unacceptable, since each sensor needs to sense the channel for at least a minimum amount of time $T_{min}$.

In the above, $T_{min}$ corresponds to the minimum amount of time that a specific M2M device must be asleep to achieve prescribed power savings. This value is obtained from the optimal link level duty cycle estimation process. This can be represented as an inequality constraint:

$$T_{sl,j} \geq T_{min}, j \in \{1, \ldots, N\}.$$

In addition to the first constraint, the overall sensing time for all sensors in the network satisfies $\|t_{sl}\|^2 - 1$. The optimization problem can be rewritten as follows:

$$\hat{t}_{sl} = \arg \max_{t_{sl}} \|Pt_{sl}\|$$

Subject to $T_{sl} > T_{min}$ \quad (6)

It is reasonable to assume that $p_{i,i} = 1$ and $P_{i,j} < 1$, $\forall i \neq j$. In other words, P is a diagonally dominant matrix. P has full column rank.

1. Note that P depends on the wireless propagation and distance between sensors, and for a random distribution of sensors, priorities and $T_{sn,j}$ it is reasonable to assume that P is a symmetric square matrix.
2. From (6), the unconstrained solution is obtained from the Eigen decomposition of P.
3. From the above properties, the eigen decomposition will lead to a distinct set of eigenvalues and eigenvectors.
4. For a symmetric, full rank matrix P, when these distinct eigenvalues are arranged in a descending order, choosing $t_{sl}$ as the eigenvector corresponding to the most dominant eigenvalue will minimise the probability transition matrix:

$$t_{sl} = u_N \text{ where } [u_1, \ldots, u_N, \lambda_1, \ldots, \lambda_N] = eig\{P\} \quad (7)$$

5. In other words (7), the optimal sleep time for the given network is given by having duty cycles proportional to $t_{sl}$.

Figure 4:
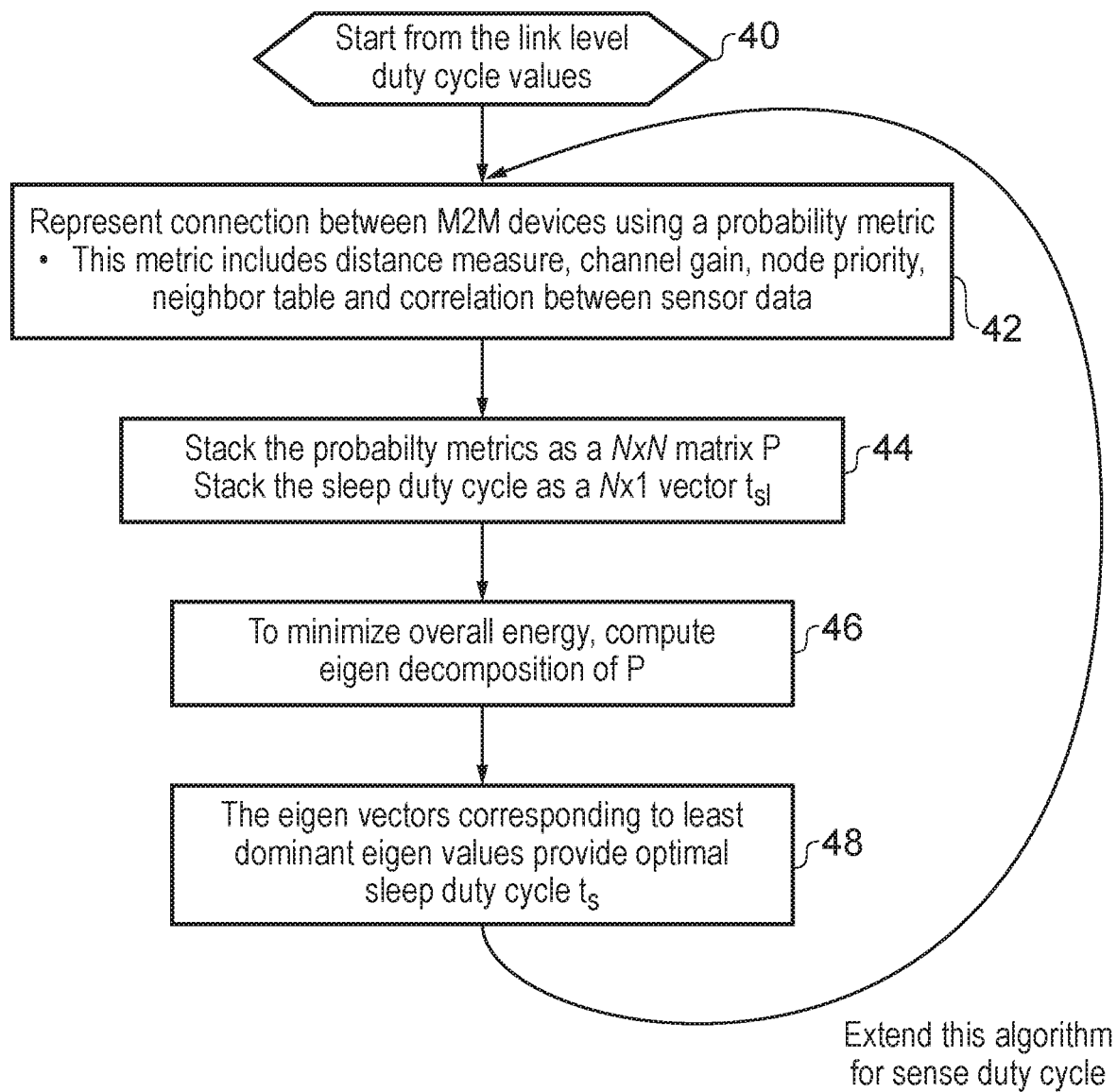
FIG. 4 shows an algorithm flow for estimating the optimal Network level duty cycle.

FIG. 4 shows a process for estimating the optimal Network level duty cycle. As can be seen in FIG. 4, the process begins at step 40, which is the end of the process depicted in FIG. 3. At step 42, the connections between M2M devices are represented using a probability metrics. At step 44, the probability metrics are stacked, as are the sleep duty cycles. For the unconstrained case, at step 46, the Eigen decomposition of the stacked probability matrix is computed to minimise overall energy consumption. At step 48, the Eigenvectors corresponding to the least dominant Eigenvalues are determined to provide the optimal sleep duty cycle.

Extending the Algorithm for Optimal Sense Duty Cycle

The expressions (5) and (6) updating the sleep duty cycle can be extended for an M2M node operating in sense mode to obtain control signaling. The optimal sense mode duty cycles are represented using a N×1 vector $t_{sn}=[T_{sn,1}, \ldots, T_{sn,N}]^T$ where $T_{sn,i}$ corresponds to the time spent during the sense mode. The initial values of $T_{sn,i}$ is obtained from the link level duty cycle estimation algorithm.

Exploiting the connections between different sensing neighbours as specified by the probability measure matrix P, the sensing information at a node can be represented as a cumulative sum:

$$T_{sn,i}(t_{sn}) = T_{sn,i} + \Sigma_{j=1}^{N} p_{i,j} T_{sn,j} \forall j \neq i$$

From the above expression the updated sensing time $T_{sn,i}(t_{sn}) \geq T_{sn,i}$ and the quality of the network sensing mode is better than the link level sensing time. Note that the accuracy of sensing information is proportional to $T_{sn,i}(t_{sn})$; thus the probability measures can be used to either:

Reduce the scan duty cycle required to achieve a specific quality of service (e.g., initial $T_{sn,i}$). This in turn reduces the overall time consumed in each sensor for the scanning phase, and thus minimises the energy consumption during the scan mode;

Provide a more accurate channel/operational state of the given sensor from a set of low-duty scan cycles.

The above processes estimate the optimal sleep duty cycle for the given network. The same approach can be extended using the probability metric to modify the transmit time from a set of sensors in uplink communication mode.

Generalization of Optimal Network Level Duty Cycle Algorithm

The probability metric can be generalized to include parameters corresponding to MAC and application layers. In such cases, the rest of the parameters are kept constant and modify only the probability metric. Assume that each M2M device provides the one-hop neighbour estimate. Note that the estimation of a one-hop neighbour is a reasonably low-complexity operation (based on coarse RSSI strength).

Including the one-hop neighbour, the probability metric can be rewritten as follows:

$$\tilde{p}_{i,j} = \begin{cases} c \frac{1}{d_{i,j}} \frac{w_j T_{si,j}}{\sum_{k=1}^{N} T_{sl,k}} & \text{if "}i\text{" and "}j\text{" are one-hop neighbors} \\ 0 & \text{otherwise} \end{cases}$$

Including the probability metric information regarding heterogeneous applications:

$$\tilde{p}_{i,j} = \begin{cases} c \frac{1}{d_{i,j}} \frac{w_{i,j} T_{si,j}}{\sum_{k=1}^{N} T_{sl,k}} & \text{if "}i\text{" and "}j\text{" are one-hop neighbors} \\ 0 & \text{otherwise} \end{cases}$$

Where $w_{i,j}$ denotes weight or priority between nodes i and j addressing two different applications. The access network can estimate this weight based on the measurement values. For example, let $x_i$ and $x_j$ correspond to the $L_n$ bit sequence received at a M2M gateway denoting message from sensors i and j. The M2M gateway might not have the application details. In such a case, the auto-correlation between these two sequences would provide a measure of the relationship between these two messages:

$$W_{i,j} = x_j^T x_i.$$

As will be appreciated, cross-layered duty cycle optimization may be extended to cross-layered optimization in an ad-hoc network setup. For example, routing for ad-hoc networks with heterogeneous applications or multi-access for heterogeneous cellular networks with split control plane.

Ad-Hoc Networks with Heterogeneous Applications:

When extended to a more general ad-hoc network space, network level optimization of routing algorithms to account for traffic bottlenecks have been proposed. However, the nodes are not necessarily energy limited and the optimization cost may be different from that of an M2M network. However, the above described algorithms can be reformulated for this problem. For example, through the optimal network level processes, neighbour cooperation can be used to enhance the performance of routing protocols.

Multi-Access for Heterogeneous Cellular Networks with Split Control Plane:

A network configuration has been proposed for heterogeneous cellular networks to split the control plane and facilitate network deployment, mitigate handover failures and achieve energy savings. Depending on their traffic requirements, the set of user equipment can be controlled either by the macro-cell or the small cells. These traffic requirements and their correlations with macro- and small-cells can be formulated as a problem similar to the optimal Network level duty cycle, and the corresponding cell selections techniques can be used.

The above described cross layered duty cycle optimization approach allows a significant increase in battery life using cross-layered optimization model and integrates heterogeneous applications with network and physical setup.

The above thus describes Physical, MAC and higher layer algorithms to estimate the optimal sleep duty cycle that each energy constrained device or an M2M device must operate within in a network serving heterogeneous applications such that the overall energy consumption in these devices is minimised. However, it is further desirable to provide adaptive learning of the network's conditions with either complete or incomplete information in order to maintain sensing accuracy and sleep duty cycle optimization The above described cross-layered duty cycle optimization can be used as a starting point for an interactive sleep management system comprising adaptive learning. Alternatively, the interactive technique can start from a randomly selected duty cycle for example. However, it should be noted that combined with the use of the optimal cross-layered duty cycle estimation, the cost may be minimised (e.g., energy, bandwidth and latency) for the interactive sleep management system to achieve the optimal performance, compared to the use of randomly selected duty cycle parameters.

Figure 5:
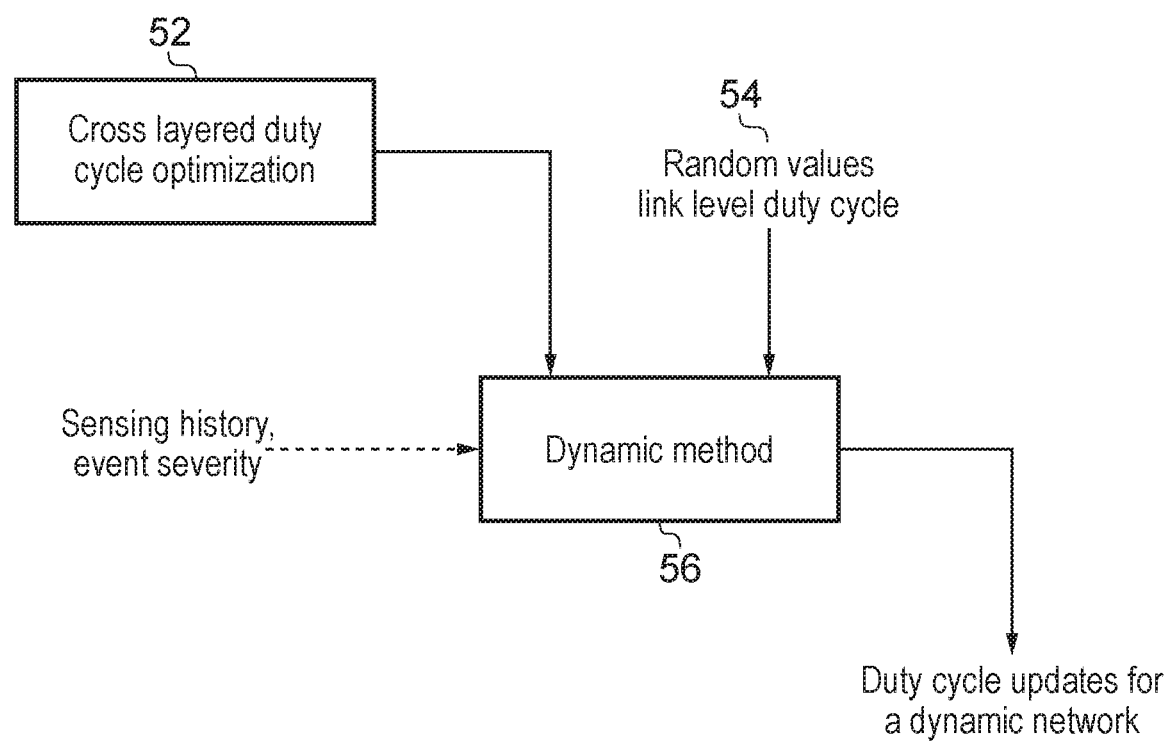
FIG. 5 schematically shows the interactive sleep management system.

FIG. 5 schematically shows an interactive sleep management process according to an example. As can be seen in FIG. 5, the interactive sleep management process can start from the cross layered duty cycle optimization of FIG. 2 at step 52 or may start at a random value of link level duty cycle at step 54. Regardless of the starting point the process proceeds to step 56 in which the dynamic interactive sleep management process is performed based on sensing history and event severity as will be described below.

Two key technologies are proposed in the interactive sleep management system:

Dynamic updates about network conditions: The use of multi-stage dynamic Bayesian game theory to model interactions between sensing phenomenon and a M2M network is proposed. The game dynamically learns traffic conditions in the network and accordingly leads the M2M devices to tune their sleep duty cycles.

Interactive control of sleep duty cycle parameters: Based on the dynamic updates provided relating to network conditions, an interactive sleep management system for M2M communications is proposed. This sleep management system starts with the network condition analysis and efficiently adjusts the sleep duty cycle parameters across the network, given the updated network condition, and application and topological relationships between local nodes. These updates and adjustments can either be done by dynamic Bayesian game models or interactive machine learning techniques for example.

In principle, an M2M network operation is modeled as a dynamic network responsive to changes in the environment with a game-theoretic method and equilibrium states of the game used to continuously learn the network. The equilibrium condition of a game leads to an accurate and reliable solution in a competing situation (that is the same situation in which the M2M network faces). Such prediction, in combination with the cross-layered duty cycle optimization and the application and topological requirements, facilitates the tuning of duty cycle parameters across a changing network.

Note that all the above techniques are not necessarily limited to M2M communications setup or energy-efficient optimization and can be easily extended to any ad-hoc network setup focusing on minimizing energy or any other objective, such as routing and duty cycle management for ad-hoc networks with heterogeneous applications, multi-access for heterogeneous cellular networks with split control plane and game-theoretic power control for cross-layered CDMA networks with uncertain information.

Consider the heterogeneous communications network 10 of FIG. 1 comprising a network including multiple M2M nodes 14, 16 and an M2M gateway 18. The above described processes for estimating cross-layered duty cycle optimization are sufficient to minimise overall energy if the network does not change over time and due to random events. Normally, any M2M network supporting heterogeneous applications would be required to handle periodic and random bursty traffic and face a changing topology. The random and bursty nature of traffic and changing topology limit the network's response towards sensing phenomena when used with static and periodic sleep and wakeup operations, and this can result in performance with high variations, leading to degrading quality of service for example.

Dynamic Games and Strategies

To account for random changes in overall sensing, an adaptive network architecture based on dynamic Bayesian game theory is proposed that models sensing phenomenon and network interactions. The proposed approach provides duty cycle parameters and network connections to the resource constrained node whenever the traffic condition of the network changes and accordingly leads the M2M nodes to adjust their sleep duty cycles. A two-player static Bayesian game according to an example is defined as follows:

One player represents an overall sensing phenomenon, identified as player i. The other player (identified as player j) represents a group of M2M nodes that is designed to detect and respond to the sensing phenomenon.

For action strategies of the players, player i has the action set:
1. playing the phenomenon trigger strategy (T) or
2. playing no phenomenon trigger strategy (NT)

Player i's action strategy is independent and random.

Player j has the action set:
1. playing the Sleep, Transition and Transmission strategy (STT) (node changes from sleep mode to active mode due to the pre-configured periodic wakeup or phenomena triggers, performs the sensing and data upload, and finally returns to the sleep mode).
2. playing the Sleep and Transition strategy (ST) (sensor node changes from sleep mode to active mode due to the pre-configured periodic wakeup trigger, performs the sensing with no data upload, and finally returns to the sleep mode),
3. playing the Sleep strategy (S) (sensor node remains in the sleep mode).

With the action strategies described above, all potential actions of players i and j are covered.

Since the action choice of player i is unknown to player j, this game logically assumes the T and NT strategies if the sensor phenomenon are being considered a critical state and the NT strategy only if the sensor phenomenon are being considered a normal state. Such an uncertain belief exists on the player is type (the critical or normal state of player i is private information for player j) but not vice versa.

Table 2 shows the strategic form and payoff matrix of a Bayesian game according to an example.

TABLE 2

| | | Player j | | |
|---|---|---|---|---|
| | | If the belief indicates critical | Detect and upload any trigger (STT) | Read any trigger (ST) | Sleep mode (S) |
| Player i | Create K triggers (T) | (1-2α) · W · K - $C_T$, (2α-1) ·W · K - $C_{STT}$ | (1-α) · W · K - $C_T$, (α-1) · W · K - $C_{ST}$ | W · K - $C_T$, (2α-1) · W · K - $C_S$ |
| | No trigger (NT) | 0, -β · P' - $C_{STT}$ | 0, - $C_{ST}$ | 0, -$C_S$ |
| | | If the belief indicates normal | Detect and upload any trigger (STT) | Read any trigger (ST) | Sleep mode (S) |
| | No trigger (NT) | 0, -β · P' - $C_{STT}$ | 0, - $C_{ST}$ | 0, -$C_S$ |

Inter-Active Relationship Between Cost and Payoffs

Table 2 presents the strategic form of players i and j and summarises payoff functions of different combinations of player strategies. In the game matrix, either player aims to accomplish its objective, gaining itself the reward W, where W>0, while the competing player incurs a loss -W. Such a model assumes there is an equal gain and loss between the game players. That is logical since the both sides operate in a selfish way for their own causes. For example, player j is set to successfully identify and report player is trigger.

With such a success, player j earns the reward W but player i pays the price, -W and vice versa.

In this interaction, it is likely that the trigger detection of a node is not 100% reliable, so α represents the positive trigger detection probability given any actual triggers and β represents the false alarm probability of detecting a trigger given no actual trigger (it refers to a false alarm if the detection shows positive while no trigger is generated), and $\alpha$, $\beta \in [0, 1]$. Running any action strategy also introduces a cost that depends on the selected action. Costs of creating a trigger T and playing the STT, ST and S strategies are denoted by $C_T$, $C_{STT}$, $C_{ST}$, and $C_S$ respectively; P' is the penalty for a false detection; where all are larger than 0 and less than W. The respective cost parameters are configured for the purpose of the rational interactions in game while taking into account the factors in M2M communications (physical and network requirements).

The cost of the action strategy of player j comprises two criteria, energy and bandwidth, since they are the most important resources in wireless communication. The cost of the action strategy of player i is an imaginary value 0. Such cost parameters and the reward could be also modelled in monetary value for wireless communication. In this table, the Expected Payoff (EP) of players i and j is equal to the sum of the expected reward and its corresponding cost with a strategy combination. It calculates the virtual outcome of every pair of strategies with the parameter K, representing the number of generated triggers in one game stage. This parameter is related to a sensor traffic (it is linked to the payload parameter $L_n$ for an M2M node n in the link level optimization as well as the aggregated value of such a parameter, determined by a common sensing objective of heterogeneous applications and local neighbours' relationship in the network level optimization).

The rational behaviours of the player i is to create phenomenon anywhere/anytime while that of the player j is to efficiently report the sensed phenomenon. This nature leads to selfish behaviours for which the player only aims at succeeding in its own goal (maximizing its own payoff metric). If one player's payoff is maximized but the other one has a room for enhancement, such a strategy combination will not be mutually accepted by both the players. The only condition that both of the players agree to participate is the use of an equilibrium strategy combination where they believe that their maximum payoffs are achieved (mutual optimality). So, Bayesian Nash Equilibrium (BNE) for the proposed game model is analyzed.

Bayesian Nash Equilibrium

Consider the uncertain type of player i (normal or critical), the probabilistic parameter p is devised to evaluate this uncertainty. This probabilistic parameter p can be seen as the belief of player j on player i's type. In this analysis, $\mu$ is a common prior for the players when they make a decision.

If the player i chooses the strategy set (T if its type is critical and NT if it is normal), the expected payoff of the player j's STT, ST and S strategies is denoted as $EP_j(STT)$, $EP_j(ST)$ and $EP_j(S)$, respectively. Table 3 summarizes equilibrium relationship of the proposed game:

TABLE 3

| Assumption | Derived condition | BNE analysis |
|---|---|---|
| If $EP_j(S) <$ $EP_j(STT) +$ $EP_j(ST)$ | $\mu > \frac{\beta P' + C_{STT} + C_{ST} - C_S}{\omega k(3\alpha - 1) + \beta P'}$ | Given the assumption, the best strategy of player j is either STT or ST. That will lead player i to change its strategy from T to NT if critical. Such a strategy set does not reach a pure BNE given the derived condition. |
| If $EP_j(S) >$ $EP_j(STT) +$ $EP_j(ST)$ | $\mu < \frac{\beta P' + C_{STT} + C_{ST} - C_S}{\omega k(3\alpha - 1) + \beta P'}$ | Given the assumption, the best strategy of player j is the S and that of player i is NT. Both the players |

TABLE 3-continued

| Assumption | Derived condition | BNE analysis |
|---|---|---|
| | | believe their payoffs are maximized given the derived condition. Such a strategy set reach a pure BNE. |

Similarly, if the player i chooses the strategy set (NT if its type is critical and NT if it is normal), the dominant strategy for player j is to use the strategy S, no matter what the value of $\mu$ is. In such a circumstance, the best strategy for player i will change to T if the type of player i is critical. This analysis reduces to the previous case, resulting in no pure BNE.

Mixed BNE Strategy:

With the analysis above, no pure BNE strategy set for the whole game is found. Therefore, a mixed strategy BNE is derived. Let P be the probability that player i generates any trigger if its type is critical. The expected payoff of player j using the STT, ST and S strategies is formulated for probability P. For the equilibrium of player is strategy, impose $EP_j(S)=EP_j(\text{non } S)=EP_j(STT)+EP_j(ST)$. That derives the probability P* of player i using the T strategy. Similarly, calculate the equilibrium of player j's strategy Q*. The derived mixed BNE strategy set is as follows:

players i and j play their strategy sets with probabilities P* and Q* respectively if player i's type is critical
player i only plays the NT if player i's type is normal
belief of player j on player is type being critical is $\mu$.
With $$P^* = \frac{\beta P^i + C_{STT} + C_{ST} - C_S}{\mu(3\alpha\omega k + \beta P^i)}$$

This is summarized in table 4 below:

TABLE 4

| Condition | Strategy | Outcome |
|---|---|---|
| $\mu < \frac{\beta P' + C_{STT} + C_{ST} - C_S}{\omega k(3\alpha - 1) + \beta P'}$ | Pure BNE | Player j believes the player i's type being normal (low $\mu$), so that the player i uses the T strategy if critical and the NT strategy if normal while the player j only uses the S strategy. |
| $\mu > \frac{\beta P' + C_{STT} + C_{ST} - C_S}{\omega k(3\alpha - 1) + \beta P'}$ | Mixed BNE strategy | Player j believes the player i's type being critical (high $\mu$) and uses his strategy set with probability Q*, and player i uses the T strategy with probability P* if critical and the NT strategy if normal. |

With the use of such a BNE analysis, the sleep management policy can be designed that achieves the mutually accepted payoff in the network.

Dynamic Bayesian Game—to Account for Changes in Network

The BNE analysis above assumes a common prior p for players' interactions. In practical applications, such a parameter depends on network environment and players' interactions. For example, if a node's traffic generation in the network is high, a high value of $\mu$ can be assigned. So the Bayesian game model described above can be extended to an evolutionary and dynamic Bayesian game, for which player j continuously updates his belief on player i's type according to the game history. This continuous game is run in n game stages with each stage's duration being equal to the average interval of wakeup cycles. The payoffs of the players in every game stage remain the same (no discount factor for a player payoff as the game progresses). Let $H_i(t)$ be the history profile of player i up to the game stage t, $OA_i(t)$ be the observed action of player i at the game stage t, $PT_i$ be the private type of player i (critical or normal), $\overline{PT}_i$ be all possible private types of player i, $\alpha_0$ be the observation success rate (probability of correctly observed an event), and $\beta_0$ be the false alarm probability of observing an event. Based on the Bayesian rule, the posterior belief of player j on player i's being critical is derived as follows.

$$\mu_{x+1} = \text{Probability of player } j\text{'s belief on player } i \quad (8)$$
$$\text{being critical at the game stage } x+1$$
$$= P(PT_i = \text{critical} | OA_i(x), H_i(x))$$
$$= \frac{\mu_x(PT_i = \text{critical} | H_i(x)) \times P(OA_i(x) | PT_i, H_i(x))}{\Sigma \overline{PT_i} \mu_x(\overline{PT_i} | H_i(x)) \times P(OA_i(x) | \overline{PT_i}, H_i(x))}$$

Figure 6:
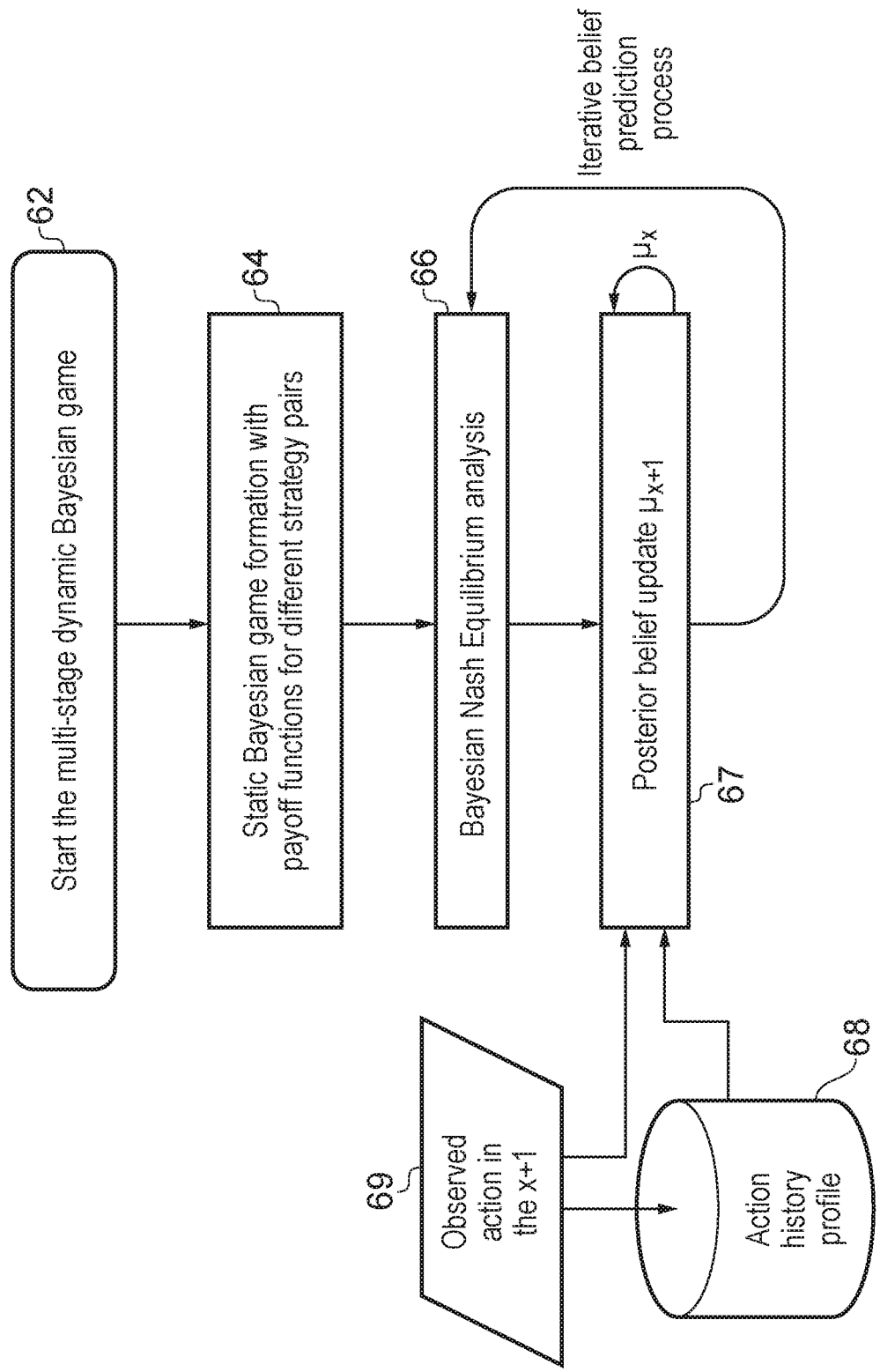
FIG. 6 schematically shows an iterative belief prediction algorithm.

FIG. 6 schematically shows an iterative belief prediction process as described above. As can be seen in FIG. 6, the process starts at step 62 where the multi-stage dynamic Bayesian game is started. At step 64, static Bayesian game formation with payoff function for different strategy pairs is performed, as shown in Table 2. In step 66, Bayesian Nash Equilibrium analysis is performed. At step 67, a posterior belief update is performed, which takes into account the action history 68 and the observed action 69.

Applications of Dynamic Bayesian Dame for M2M Communications

Figure 7:
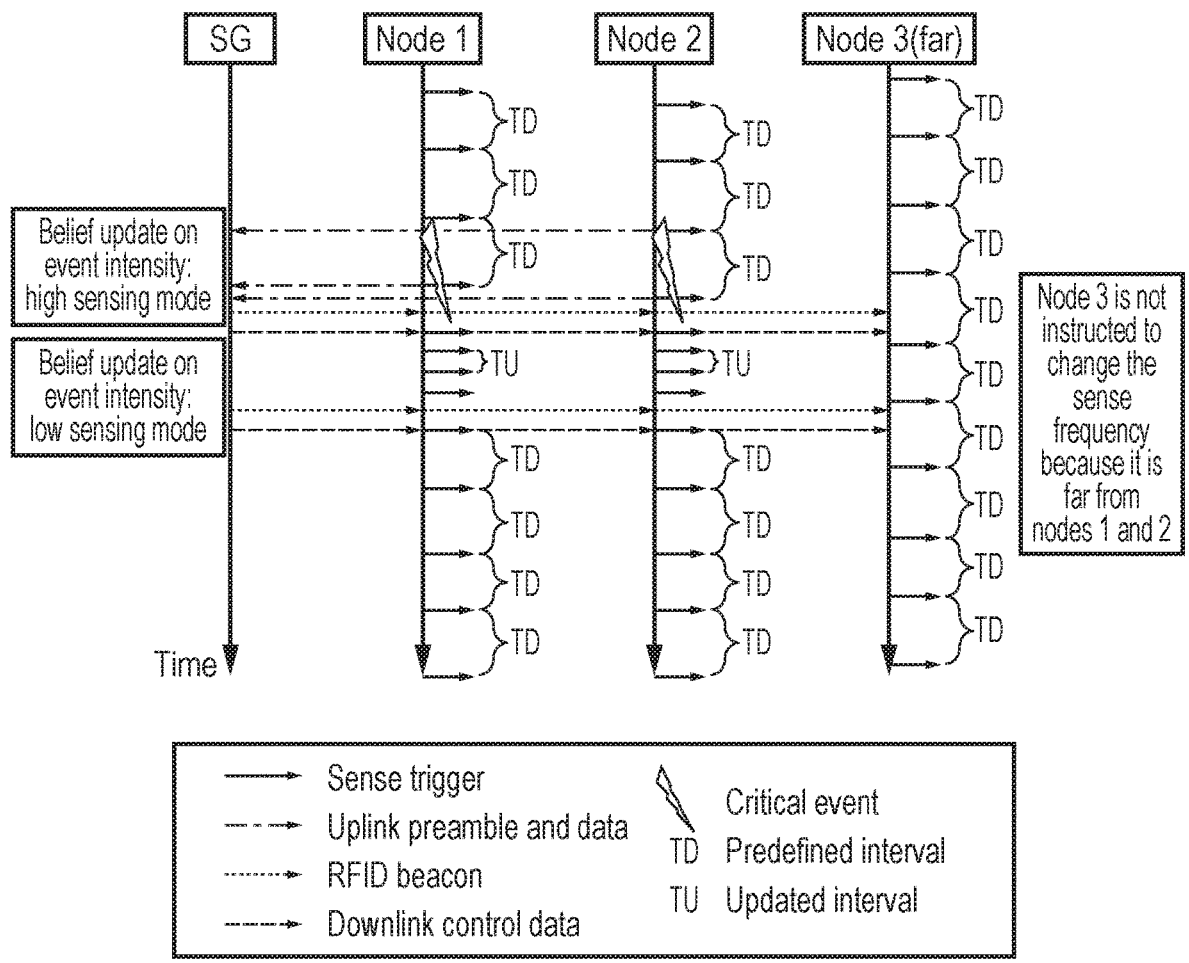
FIG. 7 shows an example of sleep management.

FIG. 7 shows an example of the sleep control operation. In FIG. 7, an access network node serving gateway (SG) is in communication with a first sensor node (Node 1), a second sensor node (Node 2) that is in close proximity to the first sensor node and a third sensor node (Node 3) which is distant from the first and second sensor nodes. Initially, the duty cycle of Node 1, Node 2 and Node 3 have long sense intervals TD. That is, each of the sensor nodes transitions to the active mode and performs a sense transmit/receive function at time intervals of TD. This mode with long sensing intervals TD may be referred to a low sensing mode.

At a particular time, a critical event (trigger event) occurs at Node 1. This critical event may be that the sensor of sensor Node 1 has data that requires transmission to the access network. This critical event is reported to the access network node SG which performs a belief update on the event severity. In this case, the SG indicates that the severity is high and that Node 1 should enter a high sensing mode, in which the update sensing intervals TU are shorter than the long sensing intervals TD.

As node 2 is in geographical proximity to Node 1, and there is therefore a likelihood that the critical event that occurred at Node 1 will also occur at Node 2, the SG determines that because of the critical event at Node 1, the duty cycle of Node 2 should also change to the high sensing mode with sensing intervals of TD, in anticipation of a possible critical event at Node 2.

After a period of time, the SG may perform a further belief update on the event severity. As a certain period of time has passed without another critical event being detected, the SG indicates that the severity is now low and that Node 1 should enter the low sensing mode, with long sensing intervals TD. At this point, the SG also indicates that Node 2 should also enter the low sensing mode. Although FIG. 7 shows Node 2 returning to the low sensing mode at the same time as Node 1, it should be appreciated that this may not be the case and in the absence of a critical event on Node 2, Node 2 may return to the low sensing mode before Node 1 does.

It is important to note here that because Node 3 is positioned geographically far away from Nodes 1 and 2, the GW does not determine that it is necessary for Node 3 to change to the high sensing mode in view of the critical event on Node 1.

Figure 8:
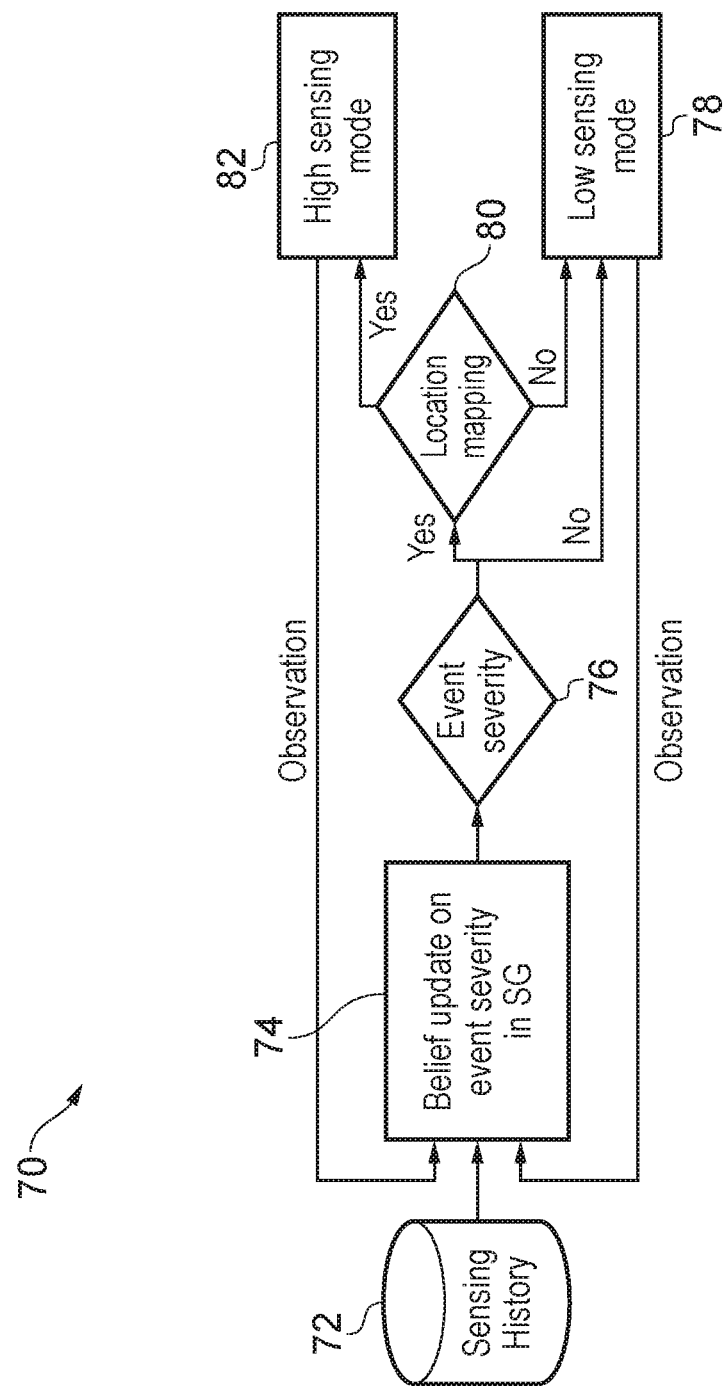
FIG. 8 schematically shows a two-stage sleep management algorithm.

FIG. 8 shows the sleep control framework 70 corresponding to the sleep control operation of FIG. 7. The framework 70 assumes that every node maintains its sleep and wakeup modes based on the derived optimal sleep duty cycle parameter. In addition, neighboring nodes asynchronously follow this parameter for the increasing temporal probability of event detections.

FIG. 8 shows a two-stage sleep control framework, in which the SG uses observed sensing data and sensing history 72 to derive its belief on event severity and update sensor nodes' sensing duty cycles. There are two filters for the final decision on the duty cycle. One is the definition of event severity 74 based on the belief update system, as described above and shown in FIG. 6, and the other is the definition of sensing coverage that allows parts of the network, affected by sensed phenomenon to perform the sleep duty cycle adjustment while the rest of the network remains unchanged. Both of the filters are application-dependent. Depending on the results of these two filters, the duty cycle of the sensor node is required to be in the low sensing mode 78 or the high sensing mode 82.

In the framework of FIG. 7, sensing history 72 of the network is stored in a storage unit. Based on the sensing history and observations from the sensor nodes, a belief update 74 on the severity of the sensing event can be performed by the access network node or access network. This belief update 74 may be performed according to the algorithm shown in FIG. 6 and as described above. Based on the belief update 74, the severity of the sensing event for a particular sensing node may be determined 76. The event severity may be determined to be a critical event that is indicative that the sensor node should be in a high sensing mode or may be determined to be a normal event that is indicative that the sensor node should be in a low sensing mode. In a high sensing mode, the sensing node may perform its sensing operation more frequently than in a low sensing mode.

In FIG. 7, if the event severity is determined to be normal and is not severe, the framework instructs the sensing node to be in a low sensing mode 78. If the event severity is determined to be severe, the framework then performs the coverage based filtering in which it is determined whether the duty cycle should be changed based on the coverage of the network. For example, if a sensing event in the network is determined to be critical, but this sensing event occurs at a sensing node that is distant from the particular sensing node in question, the duty cycle of the particular sensing node may not be updated to the high sensing mode 82 and may remain in the low sensing mode 78. Conversely, if a sensing event in the network is determined to be critical, and this sensing event occurs at a sensing node that is close, both geographically and at a network level from the particular sensing node in question, the duty cycle of the particular sensing node may be updated to the high sensing mode 82 from the low sensing mode 78.

This location mapping filter 80 furthermore minimises the energy consumption due to unnecessary node wakeup. For the definition of sensing coverage, a virtual coverage map can be built that defines the affected zone of every node given single or plural objectives of applications and any relevant detection.

The two filters in FIG. 8 are application-dependent and can be extended for a fine-grained multiple-stage sleep control with new criteria.

Figure 9:
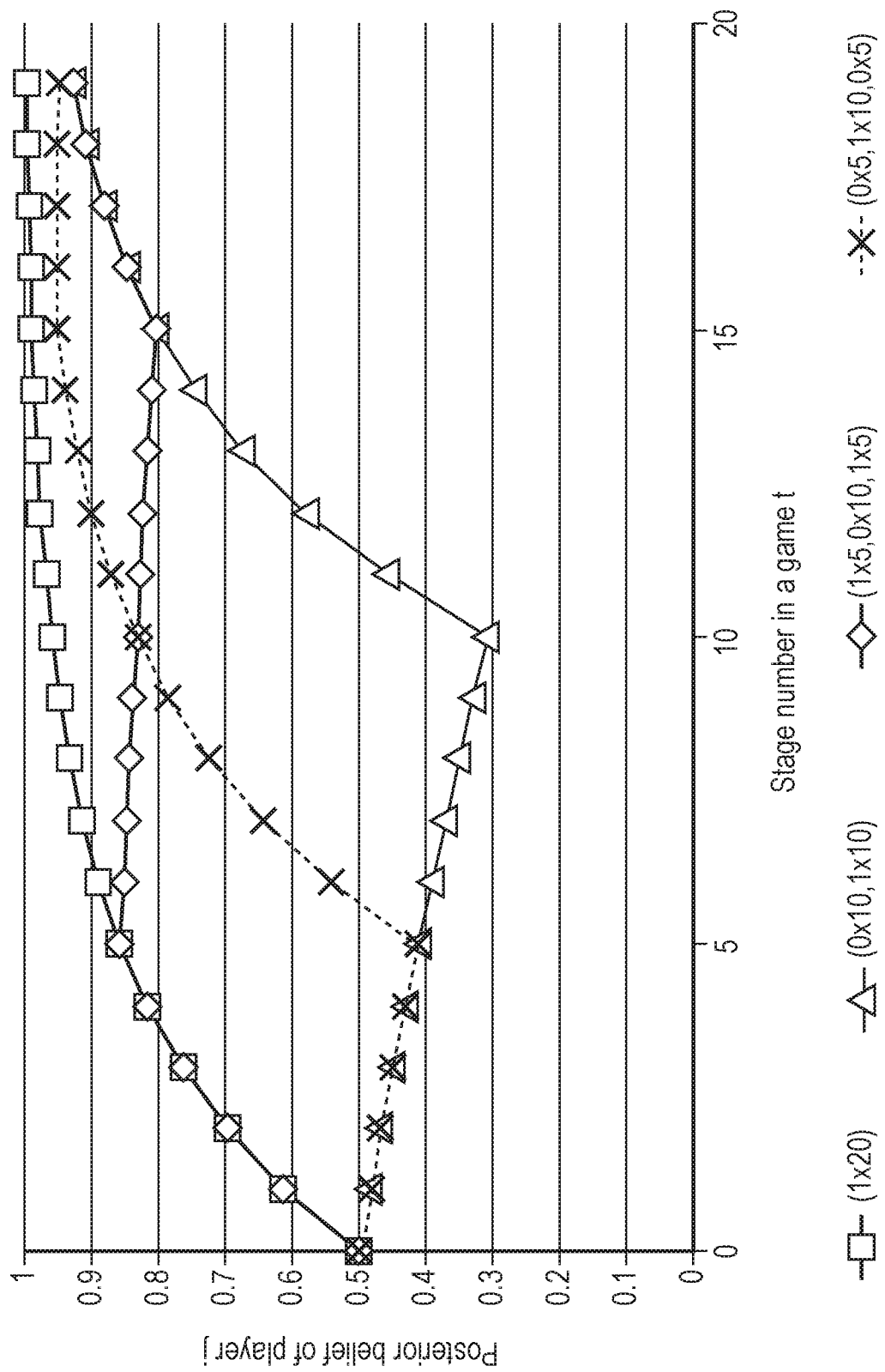
FIG. 9 shows the effect of a series of observed events on a posterior belief update.

Performance of interactive resource management technique FIG. 9 shows the effect of a series of observed events on a posterior belief update. A set of numerical simulations have been performed to demonstrate the proposed Bayesian game model. The goal is to analyze the game formulation and the equilibrium strategy between game players. In this analysis, the default values of $\alpha$, $\beta$, W, K, P', $C_{STT}$, $C_{ST}$, $C_S$, $\alpha_0$ and, $\beta_0$ parameters are 0.9, 0.01, 1, 1, 5, 0.9, 0.025, 0.001, 0.9, and 0.01, respectively. They are configured according to communication specifications. For example, the ratio of the cost parameters $C_{STT}$, $C_{ST}$ and $C_S$ is based on the CC2420 radio transceiver chip by Chipcon AS®. The notations ($\alpha$, $\beta$) and ($\alpha_0$, $\beta_0$) depend on channel condition, sensor component, etc., and serve different purposes. The $\alpha$ and $\beta$ are used in the payoff functions for game interactions while the $\alpha_0$ and $\beta_0$ are used to estimate observation errors in the belief update process. The reward w and penalty r are virtual parameters and used to model behaviours of players. In the evaluation, we tune an investigated parameter for analysis of the posterior belief update of player j.

In general, the belief update system swiftly and accurately captures a network's changes and generates a response (belief update) for that. The response with a critical event is faster than that with a normal event in this game configuration. By tuning the game parameters, the outcome of belief update can vary.

The above described dynamic management approach allows dynamic management of sleep duty cycle for changing networks. It integrates the dynamic management with network, physical and application layers and it significantly increase in battery life using the combination of cross-layered optimization model and interactive sleep management.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The invention claimed is:

1. A method of optimising energy consumed in a communications network comprising a plurality of resource limited nodes and an access network node, the method comprising:
  estimating and dynamically updating a belief on a network condition for a resource limited node of the plurality of resource limited nodes based on network observations and a history profile of the network observations by calculating a probability according to a two-player dynamic Bayesian game in which a first player, i, represents an overall sensing phenomenon and a second player, j, represents the plurality of resource limited nodes in which a posterior belief of player j's belief on player i's type being critical is:

$$P(PT_i = \text{critical} \mid OA_i(x), H_i(x)) =$$

$$\frac{\mu_x(PT_i = \text{critical} \mid H_i(x)) \times P(OA_i(x) \mid PT_i, H_i(x))}{\sum_{\overline{PT_i}} \mu_x(\overline{PT_i} \mid H_i(x)) \times P(OA_i(x) \mid \overline{PT_i}, H_i(x))}$$

where $H_i(t)$ is a history profile of player i up to a game stage t, $OA_i(t)$ is an observed action of player i at a game stage t, and $PT_i$ is a private type of player i, the private type of player i being either critical or normal, $\overline{PT_i}$ is a set of all possible private types of player i;
  determining whether a severity of the updated belief in the network condition is indicative that a change in sleep duty cycle of the resource limited node is required;
  determining whether a correlation between the resource limited nodes within the plurality of resource limited nodes is indicative that a change in sleep duty cycle of the resource limited node is required; and
  updating the sleep duty cycle of the resource limited node to optimize an overall energy consumed in the resource limited nodes when the severity of the updated belief in the network condition as well as the correlations between resource limited nodes indicates that a change in sleep duty cycle of the resource limited node is required.

2. The method according to claim 1, wherein in response to determining that the severity of the updated belief in the network condition is indicative that a change in sleep duty cycle of the resource limited node is required to optimize the overall energy consumed in the resource limited node while achieving a specific detection threshold, and the correlation between the resource limited nodes is not indicative that a change in sleep duty cycle of the resource limited node is required, no update in the sleep duty cycle of the resource limited node is performed.

3. The method according to claim 1, wherein in response to determining that the severity of the updated belief in the network condition indicates a critical event, the sleep duty cycle of the resource limited node is reduced to trigger the resource limited node to more frequently switch from a sleep mode to an active mode.

4. The method according to claim 1, wherein in response to determining that the severity of the updated belief in the network condition indicates that an event severity is low, the sleep duty cycle of the resource limited node is increased to trigger the resource limited node to less frequently switch from a sleep mode to an active mode.

5. The method according to claim 1, wherein correlation between the resource limited nodes within the plurality of resource limited nodes is based on a topographical relationship between local nodes, application correlations between resource limited nodes, statistical correlation between their wireless channels or a combination thereof.

6. The method according to claim 5, wherein the topographical relationship between local nodes comprises a physical proximity of the resource limited node to other nodes of the plurality of resource limited nodes and communication proximity of the resource limited node to the other nodes of the plurality of resource limited nodes.

7. The method according to claim 1, wherein the correlation metric between local nodes is a filter that ensures that the sleep duty cycle of a part of a communications network likely to be affected by the network condition to be updated while the sleep duty cycles of parts of the communications network unlikely to be affected by the network condition remain unchanged.

8. The method according to claim 1, wherein at initialization of a communications network, the sleep duty cycle of a resource node is an optimized sleep duty cycle and the sleep duty cycles of affected nodes are dynamically updated while the communications network is in operation to ensure the sleep duty cycle is optimized.

9. The method according to claim 1, wherein at initialization of a communications network, any starting value for a sleep duty cycle parameter is determined and the sleep duty cycle is dynamically updated while the communications network is in operation to ensure the sleep duty cycle is optimized.

10. The method according to claim 1, wherein the belief update on the network condition is estimated using a multi-stage Bayesian method with game-theoretic payoff functions for different strategy pairs.

11. The method according to claim 1, wherein the belief update on the network condition is estimated by using a Bayesian Nash Equilibrium analysis in conjunction with a Bayesian rule and a set of network observations.

\* \* \* \* \*